United States Patent [19]
Hemmings

[11] 3,756,647
[45] Sept. 4, 1973

[54] MOTOR VEHICLE BODY STRUCTURE
[75] Inventor: Keith Reginald Hemmings, Adlington, England
[73] Assignee: British Leyland Truck and Bus Division Limited, Leyland, England
[22] Filed: July 12, 1971
[21] Appl. No.: 161,484

[52] U.S. Cl. ............................ 296/28 A, 180/54 F
[51] Int. Cl. ............................................. B60k 5/04
[58] Field of Search ................ 180/54 F; 296/28 R, 296/28 A, 28 AB, 28 F

[56] References Cited
UNITED STATES PATENTS
2,938,591  5/1960  Porsche ............................ 180/54 F
3,521,721  7/1970  Porsche et al. ..................... 180/54 F
3,047,331  7/1962  Porsche et al. ................. 180/54 F X
2,855,064  10/1958  McCullough ....................... 180/54 F FOREIGN PATENTS OR APPLICATIONS
1,112,480  5/1968  Great Britain .................... 180/54 F Primary Examiner—Robert J. Spar
Attorney—Harold T. Stowell, Thomas J. Greer, Jr. et al.

[57] ABSTRACT

A motor vehicle body for a passenger vehicle is of monocoque construction and includes a cantilevered section at one end beneath which an engine or its accessories can be mounted.

1 Claim, 1 Drawing Figure

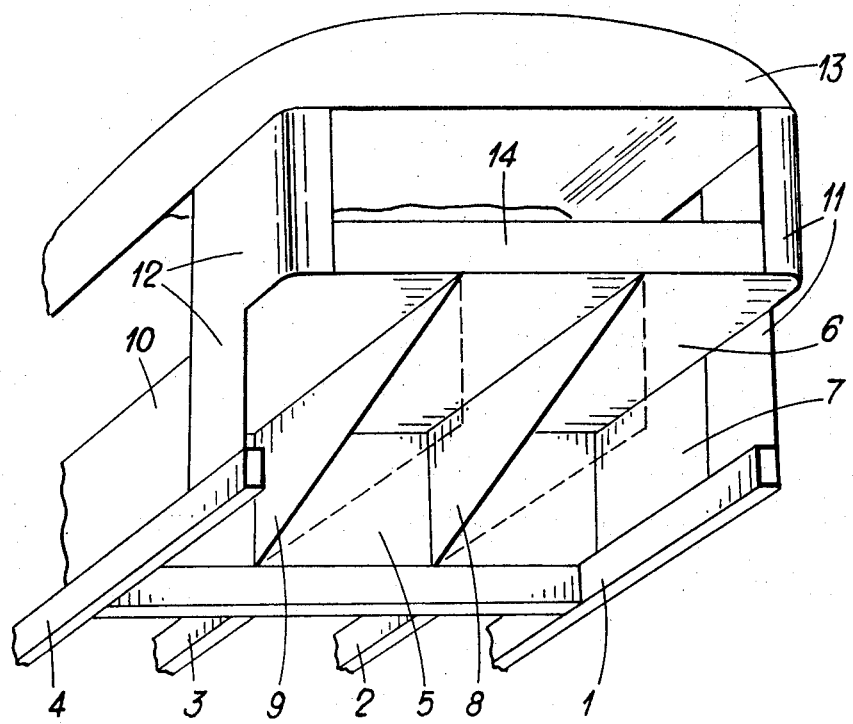

MOTOR VEHICLE BODY STRUCTURE

The present invention relates to motor vehicle body structures and more particularly to the bodies of public service vehicles.

According to the present invention an integral construction body of a public service vehicle includes the following combination of features:

a. a vertical stressed metal panel extending transversely of the body across substantially its full width and having a height less than the height of the body so that its top edge is suitable to form part of the base for a passenger seat;

b. a horizontal stressed metal panel extending rearwardly and transversely of the body across substantially its full width at the same height as the said top of said vertical stressed panel;

c. means securing the leading edge of said horizontal panel to the said top of said vertical panel;

d. structural stressed web means located on the underside of said horizontal panel and to the rear of said vertical panel and interconnecting said two panels;

e. first and second upright stressed metal corner panels located at each side of said horizontal panel and means securing said first and second corner panels to said horizontal panel;

f. a stressed metal roof panel terminating at its rearward end adjacent the tops of said two corner panels and means securing the tops of said corner panels to said roof panels;

g. a vertical stressed metal back panel extending transversely of said vehicle body and having its two ends terminating adjacent said two corner panels respectively, and means securing the ends of said back panel to said two corner panels and means securing the rear edge of said horizontal panel to said back panel;

h. first and second longitudinally extending stressed metal side panels and means for securing their rearward ends to said two corner panels respectively, said panels extending forwardly of said corner panels;

i. first and second underframe members extending longitudinally of said body and located at the sides thereof, and means connecting said longitudinal underframe members to said longitudinally extending metal panels and to said corner panels;

j. a third underframe extending transversely of said body and interconnecting said first and second underframe members;

k. means securing said third underframe member to said transversely extending panel; and l. said vertical panel, said horizontal panel, said corner panels and said first and second side panels defining a compartment having an open base and a rear end which is not closed by a structural member of the vehicle body.

How the invention may be carried out will be described by way of example only with reference to the accompanying drawing the single FIGURE of which is a fragmentary diagrammatic perspective view from the rear of the underside of a public service vehicle embodying the present invention.

A bus has a monocoque body/chassis construction with an under frame which has longitudinally rearwardly extending members as 1 to 4 which are interconnected by an upright load bearing metal panel 5.

A horizontally extending panel 6 which is also used as a passenger seat mounting or base is cantilevered from the top of the panel 5 and further load bearing panels 7, 8, 9 and 10 interconnect the panels 5 and 6.

Rear roof supports in the form of load bearing panels 11 and 12 extend upwardly from the panel 6 to carry a load bearing roof panel 13. A further load bearing panel 14 interconnects the roof supports 11 and 12.

The panels 5, 7 and 10 are loaded in shear.

The space below the panel 6 can be used to accommodate a radiator and fan for an internal combustion engine which is mounted from the members 2 and 3.

As there is no underframe member extending across the rearmost part of the vehicle the access to the engine and its accessories is improved. The rear of the space below panel 6 bounded by roof supports 11, 12 and beneath panel 14 is closed by an ornamental panel which is easily removed to provide access to the engine.

The triangular shaped panels or webs 8 and 9 may alternatively be replaced by rectangular panels so that the lower edges of the latter can form a support from which to hang or mount the vehicle engine.

In the embodiment illustrated all the panels are steel although it is possible that other materials may be used.

The present invention provides a rear end body structure for a rear engined bus which structure enables easy access to the engine and its accessories.

I claim:

1. An integral construction body of a passenger service vehicle including:

a. a vertical stressed metal panel extending transversely of the body across substantially its full width and having a height less than the height of the body so that its top edge is suitable to form part of the base for a passenger seat;

b. a horizontal stressed metal panel extending rearwardly and transversely of the body across substantially its full width at the time height as the said top of said vertical stressed panel;

c. means securing the leading edge of said horizontal panel to the said top of said vertical panel;

d. structural stressed web means located on the underside of said horizontal panel and to the rear of said vertical panel, interconnecting said two panels and orthogonal to both, e. first and second upright stressed metal corner panels located at each side of said horizontal panel and means securing said first and second upright panels to said horizontal panel;

f. a stressed metal roof panel terminating at its rearward end adjacent the tops of said two corner panels and means securing the tops of said corner panels to said roof panel;

g. a vertical stressed metal back panel extending transversely of said vehicle body and having its two ends terminating adjacent said two corner panels respectively, and means securing the ends of said back panel to said two corner panels and means securing the rear edge of said horizontal panel to said back panel;

h. first and second longitudinally extending stressed metal side panels and means for securing their rearward ends to said two corner panels respectively, said side panels extending forwardly of said corner panels;

i. first and second outermost underframe members extending longitudinally of said body and located at the sides thereof, and means connecting said longitudinally underframe members to said longitudinally extending metal panels and to said corner panels;

j. a third underframe member extending transversely of said body and interconnecting said first and second underframe members;

k. means securing said third underframe member to said vertical, transversely extending panel;

l. said vertical, transversely extending panel, said horizontal panel, said corner panels and said first and second side panels defining a compartment having an open base and a rear end which is not closed by a structural member of the vehicle body.

* * * * *

UNITED STATES PATENT OFFICE
CERTIFICATE OF CORRECTION

Patent No. 3,756,647         Dated September 4, 1973

Inventor(s) KEITH REGINALD HEMMINGS

It is certified that error appears in the above-identified patent and that said Letters Patent are hereby corrected as shown below:

Foreign Application Priority Data

July 11, 1970   Great Britain . . . . . . . 33763/70

Signed and sealed this 5th day of March 1974.

(SEAL)
Attest:

EDWARD M. FLETCHER, JR.
Attesting Officer

C. MARSHALL DANN
Commissioner of Patents